United States Patent [19]

Mochizuki et al.

[11] Patent Number: 5,414,632
[45] Date of Patent: May 9, 1995

[54] SYSTEM AND METHOD FOR PREDICTING FAILURE IN MACHINE TOOL

[75] Inventors: Yasumasa Mochizuki; Tomoaki Yoshino; Shinichi Hasegawa; Masakazu Sano, all of Shizuoka, Japan

[73] Assignee: Jatco Corporation, Fuji, Japan

[21] Appl. No.: 846,666

[22] Filed: Mar. 5, 1992

[30] Foreign Application Priority Data

Mar. 6, 1991 [JP] Japan .................... 3-040296

[51] Int. Cl.$^6$ .................. G06F 15/46; G05B 13/02
[52] U.S. Cl. .................. 364/474.16; 364/474.22; 364/474.19; 364/153
[58] Field of Search .................. 364/474.15–474.19, 364/152, 153, 185, 192, 188; 318/632, 561, 603, 640, 513, 565, 566, 634, 571615, 568.24, 569, 626

[56] References Cited

U.S. PATENT DOCUMENTS

| | | | |
|---|---|---|---|
| 4,542,471 | 9/1985 | Inaba et al. | 364/185 |
| 4,551,808 | 11/1985 | Smith et al. | 364/474.17 |
| 4,713,770 | 12/1987 | Hayes et al. | 364/474.17 |
| 4,918,616 | 4/1990 | Yoshimura et al. | 364/474.17 |
| 5,115,403 | 5/1992 | Yoneda et al. | 364/474.15 |
| 5,221,884 | 6/1993 | Teshima | 318/569 |

FOREIGN PATENT DOCUMENTS 63-14205 1/1988 Japan .
1-121637 8/1989 Japan .

*Primary Examiner*—James P. Trammell
*Attorney, Agent, or Firm*—Foley & Lardner

[57] ABSTRACT

In system and method for predicting an occurrence of failure in a machine tool, at least one monitor data (for example, position deviation variable of a tool with respect to a target position of the tool as a result of rotation of a servomotor) which is changed according to an operating situation in a series of working processes in the machine tool is detected, a prediction level of failure against the monitor data is set, the prediction level being set according to the operating situation, a comparison period of time is set according to the series of the working processes, the monitor data detected is compared with the prediction level set during a predetermined one of the series of working processes of the machine tool set as the comparison period of time, a failure prediction signal is output when the value of the monitor data exceeds the prediction level, and the prediction of the occurrence of failure is informed through a CRT on the basis of the received failure prediction signal.

22 Claims, 13 Drawing Sheets

SYSTEM AND METHOD FOR PREDICTING FAILURE IN MACHINE TOOL

BACKGROUND OF THE INVENTION (1) Field of the Invention

The present invention relates to a system and method for predicting a failure in a machine tool and especially relates to the suitable system and method for predicting the failure in a numerical control (NC) machine tool.

(2) Description of the background art

Generally, a failure monitoring system is incorporated into a numerical control machine tool. The failure monitoring system monitors whether the numerical control (NC) machine tool malfunctions or fails, issues automatically an alarm when the numerical control (NC) machine tool malfunctions, and simultaneously halts the NC machine tool.

Such a monitoring system as described above always monitors a monitor data such as a load current flowing through a servomotor and which is varied according to a working situation of the machine tool through a series of working processes and issues the alarm when the monitor data exceeds a common alarm threshold level during the execution of the series of working processes of the machine tool.

It is noted that during the execution of the series of working processes the monitor data such as the load current are often varied over a predetermined range due to a variation of load although the machine tool operates normally.

Therefore, in a previously proposed monitoring system as described above, the common alarm threshold level is necessarily set to a relatively large value. Consequently, if a detection of abnormality in the machine tool is delayed, a catastrophic damage might occur in an installation including the machine tool.

On the other hand, a Japanese Patent Application First Publication No. Showa 63-14205 exemplifies another previously proposed failure monitoring system for the machine tool which determines whether the monitor data exceeds the common alarm threshold level, while avoiding the situations of deriving the monitor data when the large variation in the monitored data generally occurs such as when the machine tool is started and halted. However, since the alarm level is also set so as to be common to the series of working processes of the machine tool in the above-described case, the problem of delaying the detection of an abnormality is still present.

SUMMARY OF THE INVENTION

It is, therefore, an object of the present invention to provide a system and method for predicting or estimating an occurrence of failure in a machine tool which are capable of specifying a predetermined working process from among a series of working processes of the machine tool as a monitoring period of time for monitor data so as to detect, at an earlier time, an abnormality in the machine tool and to predict its occurrence of failure.

The above-described object can be achieved by providing a system for predicting an occurrence of failure in a machine tool, comprising: a) first means for detecting a monitor data which is changed according to an operating situation in a series of working processes of the machine tool; b) second means for setting a prediction level of failure against the monitor data, the prediction level being set according to the operating situation; c) third means for comparing the monitor data detected by the first means with the prediction level set by the second means during a predetermined one of the series of working process of the machine tool and outputting a failure prediction signal when the value of the monitor data exceeds the prediction level; and d) fourth means for informing the prediction of the occurrence of failure on the basis of the received failure prediction signal.

The above-described object can also be achieved by providing a system for predicting an occurrence of failure in a machine tool, comprising: a) first means for detecting a plurality of monitor data whose magnitudes are changed according to respective operating situations in a series of working processes in the machine tool; b) second means for setting one or each of a plurality of prediction levels of failure against the respective monitor data, each prediction level being set according to a corresponding one of the operating situations; c) third means for comparing each of the monitor data detected by the first means with one or each of the prediction levels set by the second means and corresponding to the monitor data during each predetermined series of working process of the machine tool and outputting a failure prediction signal whenever the value of the monitor data exceeds the corresponding prediction level; and d) fourth means for informing the prediction of the occurrence of failure on the basis of the received failure prediction signal.

The above-described object can also be achieved by providing a method for predicting an occurrence of failure in a machine tool, comprising the steps of: a) detecting at least one monitor data which is changed according to an operating situation in a series of working processes in the machine tool; b) setting a prediction level of failure against the monitor data, the prediction level being set according to the operating situation; c) setting a comparison period of time according to the series of the working processes and comparing the monitor data detected in the step a) with the prediction level set in the step b) during a predetermined one of the series of working processes of the machine tool set as the comparison period of time; d) outputting a failure prediction signal when the value of the monitor data exceeds the prediction level; and e) informing the prediction of the occurrence of failure on the basis of the received failure prediction signal.

DETAILED DESCRIPTION OF THE PREFERRED EMBODIMENTS

Reference will, hereinafter, be made to the drawings in order to facilitate a better understanding of the present invention.

Figure 1:
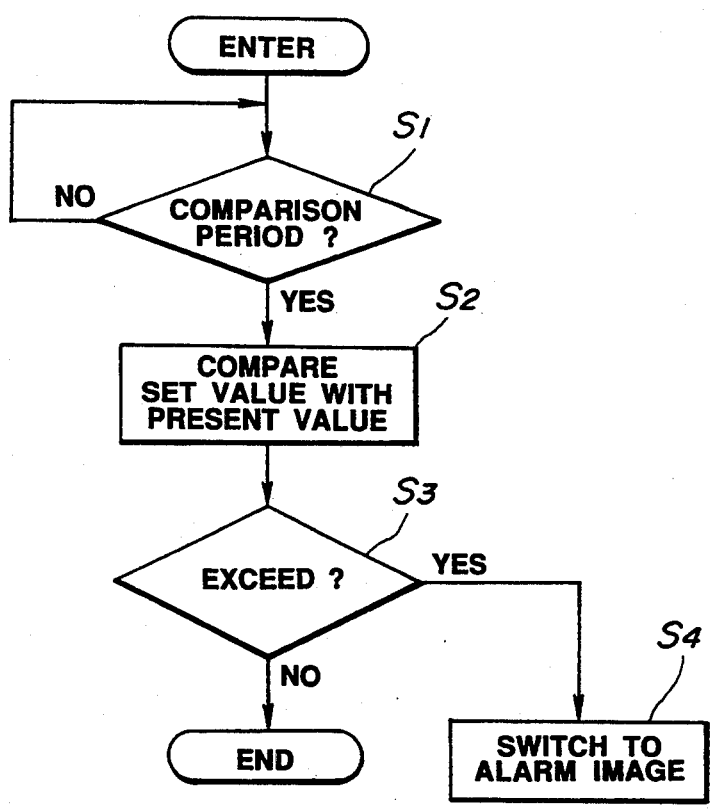
FIG. 1 is an operational flowchart for explaining a basic operation of a system for predicting a failure in a machine tool in a preferred embodiment according to the present invention.
Figure 2:
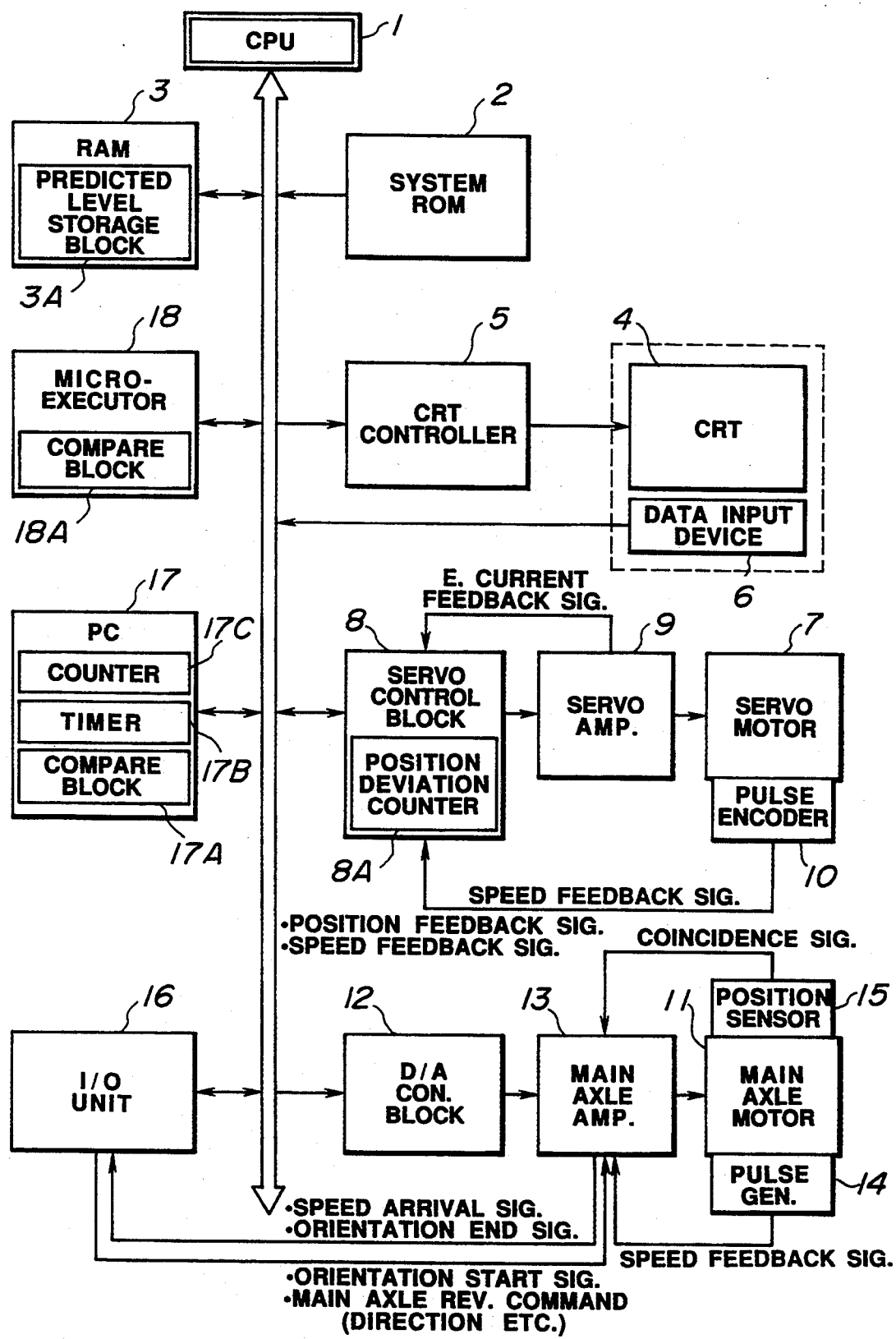
FIG. 2 is a simplified circuit block diagram of a system configuration of the failure predicting system in the machine tool shown in FIG. 1.

FIGS. 1 and 2 show operational flowchart for explaining a basic operation of a system for predicting a failure in a NC machine tool and its system configuration in a preferred embodiment according to the present invention.

It is noted that the failure predicting system according to the present invention functionally includes: detecting means for detecting a monitor data such as a load current flowing through a servomotor and varying according to an operating situation of a machine tool; setting means for setting a failure prediction level corresponding to the monitor data; and comparing means for comparing a value of the monitor data derived from the detecting means with the failure prediction level derived from the setting means during a comparison period of time specified by a specification block and for outputting a failure prediction signal when the former exceeds the latter. It is noted that the specification block specifies a predetermined working process period in the series of working processes of the machine tool as the specified comparison period of time. For example, in the series of working processes such as those of punching a plurality of holes on a work, the comparison period of time is specified for the period of time during which a tool is fed without load at a constant speed. The failure predicting system further includes informing means for informing the prediction of occurrence of failure on the basis of the failure prediction signal through displayed images.

In FIG. 1, in a step $S_1$, the failure predicting system determines whether the present time, is in the comparison period of time specified by the specification block. Then the routine goes to a step $S_2$ when it is in the comparison period of time. In the step $S_2$, the comparing means compares the present value of the monitor data derived from the detecting means with the set value set by the failure prediction level setting means. If the present value exceeds the predicted value, the comparing means outputs the failure prediction signal and the informing means informs the failure prediction In step $S_4$. In the preferred embodiment, the informing means switches the displayed image to an alarm image on a CRT (Cathode Ray Tube). According to the displayed contents of the image screen, an operator receives the information of the prediction of occurrence of failure and takes an appropriate action to recover the NC machine tool.

It is noted that since the comparing means is operated only when it is in the comparison period of time specified by the specification block, the failure prediction level is a comparison reference level exclusively used for the monitor data only during the specified period of time specified by the specification block.

Hence, the value of the failure prediction level is a value suitable or optimum for estimating or predicting the failure in the machine tool at earliest time and which has a relatively small difference from a normal value of the monitor data during the specified period of time.

Next, a specific example will be described below in a case where the failure prediction system according to the present invention is applied to the NC machine tool.

As shown in FIG. 2, the failure predicting system in the preferred embodiment Structurally includes: a CPU (Central Processing Unit) 1, a system ROM (Read Only Memory) 2 in which a basic control program is stored, and RAM (Random Access Memory) 3 in which working programs and various kinds of operation data are temporarily stored. The RAM 3 is provided with a memory block 3A for storing a prediction level to be described later. The failure predicting system further includes a CRT (Cathode Ray Tube) controlled by means of a CRT controller 5 and a data input device 6 through which the operator operates the system. The data input device 6 serves to input the data on one or each of the failure prediction levels as will be described later and is incorporated into the CRT 4 so that the image exchange on the displayed screen can also be carried out therethrough.

In addition, a servomotor 7 is provided for moving and determining a position of a tool. The servomotor 7 receives a feedback control through a servo controller 8 and a servo amplifier 9. In detail, an output pulse from a pulse encoder 10 for detecting a displacement of the tool is feedback to the servo controller 8 in the form of a tool position detection signal and a tool displacement speed detection signal. A detection signal of a load current flowing through the servomotor 7 is feedback from the servo amplifier 9 to the servo controller 8. The servo controller 8 is generally constituted by a tool position control block and tool displacement speed control block.

The position control block is provided with a deviation counter 8A which derives a deviation (position deviation) between contents of a command signal (pulse) derived from the CPU 1 and contents of position feedback signal (pulse) derived from the pulse encoder 10. The position control block controls the position of a tool through the servomotor 7 so that its deviation variable becomes zero. The position deviation variable and the value of the load current flowing through the servomotor 7 fedback to the servo controller 8 are input to a data bus of the CPU 1 to be utilized as the monitor data of the machine tool as will be described later.

As shown in FIG. 2, a main axle motor 11 is provided to rotate a main axle of the NC machine tool (not shown). The main axle motor 11 is controlled by means of a D/A (Digital-to-Analog) converter 12 and main axle amplifier 13. An output pulse from a pulse generator 14 is fedback to the main axle amplifier 13 as the speed detection signal on the main axle. The pulse generator 14 serves to detect the rotation speed of the main axle and to detect the rotational position of the main axle. The main axle and the NC machine tool is exemplified by a Japanese Utility Model Registration No. Heisei 1-121637 published on Aug. 17, 1989, the disclosure of which is herein incorporated by reference.

In addition, the main axle amplifier 13 outputs a speed arrival signal when a rotation speed of the main axle motor 11 reaches a target speed included in a speed command signal derived from the CPU 1. The speed arrival signal is input to a system bus via an input/output (I/O) unit 16 including a relay and so on. The main axle (not shown) driven by means of the main axle motor 11 is provided with a position sensor 15 which outputs a coincidence signal when the main axle rotates and stops at a predetermined rotational position for tool exchange. The main axle amplifier 13 can serve to stop and position the main axle at a predetermined rotation position in response to the signal derived from the position sensor 15. Such an operation of positioning (hereinafter simply referred to as an orientation) is executed when an orientation start command is issued from the CPU 1. When the orientation is ended, the main axle amplifier 13 outputs an orientation end signal. The orientation end signal is input to the system bus via the I/O unit 16.

The speed arrival signal derived from the main axle amplifier 13, orientation end signal, main axle motor rotation command, and orientation start command issued from the CPU 1 are utilized to derive a speed arrival time of the main axle and orientation time which serve as the monitor data as will be described later.

As shown in FIG. 2, a PC (Programmable Controller) 17 is provided which operates in accordance with internally stored sequence control programs. The PC 17 functionally includes a comparison block 17A as will be described later, a timer 17B, and a counter 17C. In addition, a micro-executor 18 is provided which executes a firmware (ROMed) microprogram and is constituted by a comparison block 18A as will be described later and having a function to prepare images on the CRT 4.

Next, an operation of the failure predicting system in the preferred embodiment will be described below.

In the preferred embodiment, as the monitor data, the four kinds of data described below are utilized, respectively or independently.

A) the position deviation variable as the result of rotation of the servomotor 7.
B) the load current value of the servomotor 7.
C) the orientation time of the main axle.
D) the speed arrival time of the main axle.

The series of operations for the failure predictions are divided according to the kinds of the utilized data of A) through D).

A) Failure prediction using the position deviation variable as the result of rotation of the servomotor 7.

"(Position Deviation)"

The position deviation variable is derived by means of the position deviation counter 8A of the servo controller 8 as the data on the servo control as described before and is input to the data bus. Hence, the position deviation counter constitutes the data detecting means described above.

Figure 4:
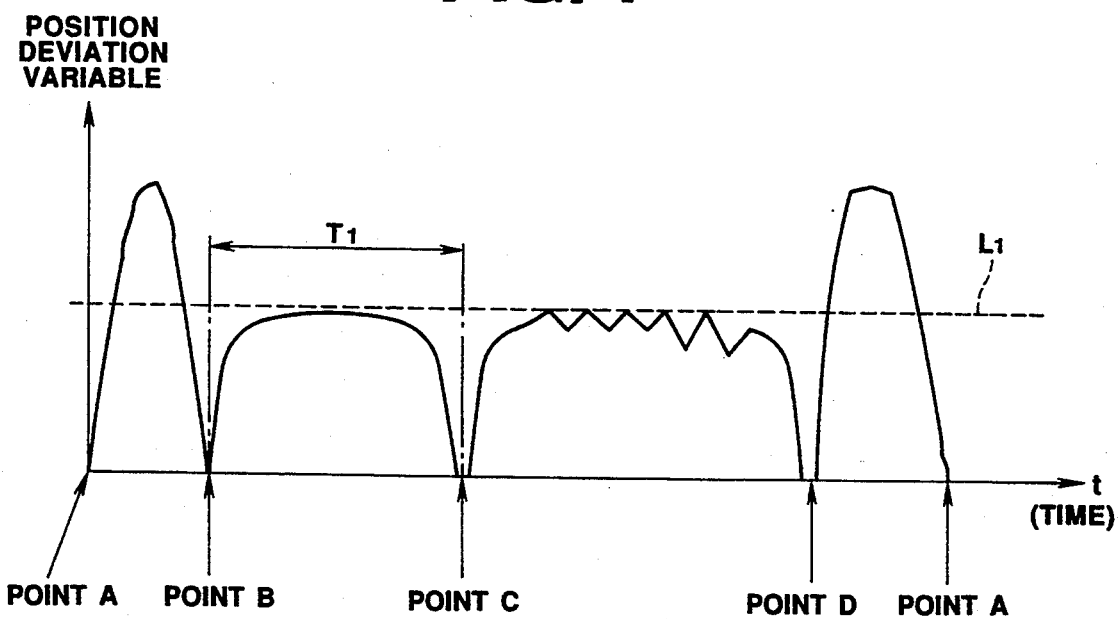
FIG. 4 is a characteristic graph of a position deviation variable of a tool by means of a servomotor in the example of the series of working processes of the machine tool shown in FIG. 3.

FIG. 4 shows an example of a change pattern of the position deviation variable of an example of a tool during the series of working processes of the machine tool in a normal operating condition of the machine tool.

Figure 3:
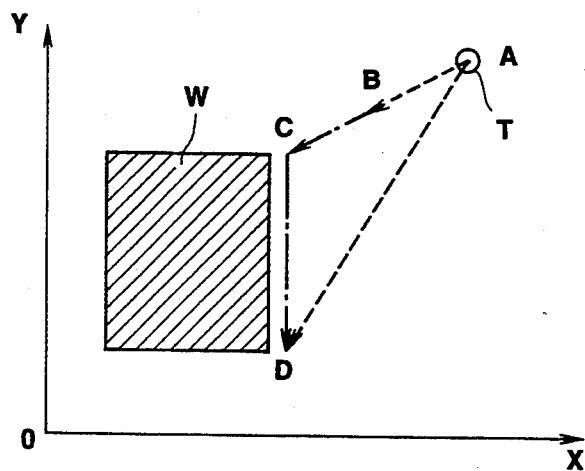
FIG. 3 is a trajectory graph of a movement of a tool T with respect to a work in an example of a series of working processes of the NC machine tool.

FIG. 3 shows the case when a tool T used in the series of working processes draws a trajectory passing through points A, B, C, and D by means of the servomotor 7.

It is noted that, in FIGS. 3 and 4, a part of the trajectory from the point A to the point B denotes a rapid feed of the tool T using the servomotor 7, a part of the trajectory from the point B to the point C denotes a constant speed feed with no load, a part of the trajectory from the point C to the point D denotes a constant speed cutting feed, and a part of the trajectory from the point D to the point A denotes the rapid feed of the tool T. Then, the position deviation variable is always monitored by means of the micro-executor 18. In FIG. 3, w denotes a contour of a work to be processed using the tool T in an X-Y coordinate system.

Figure 5:
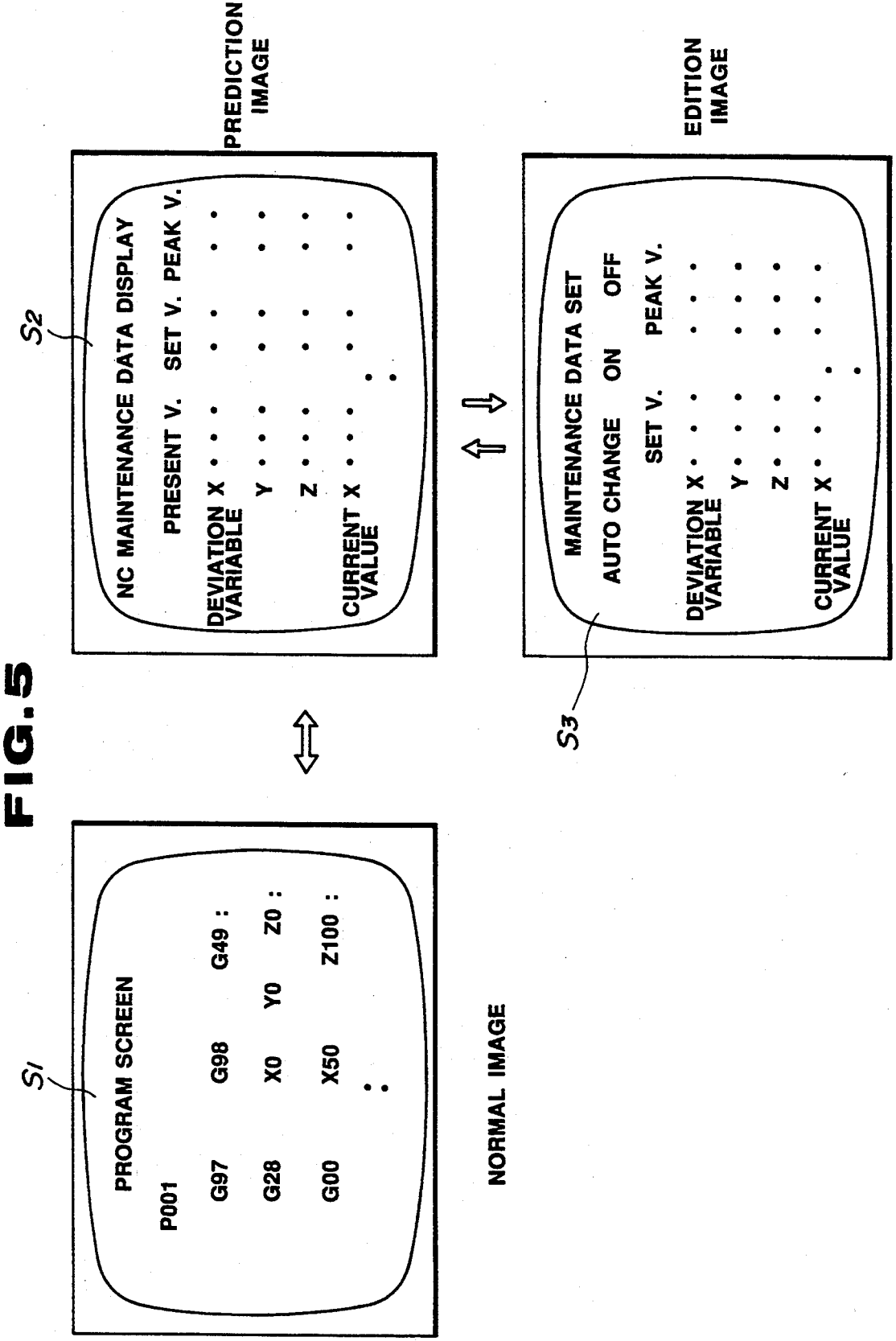
FIG. 5 is a front view of a series of images displayed on a CRT (Cathode Ray Tube) shown in FIG. 2.

That is to say, the micro-executor 18 is operated to display a prediction image $S_2$ through the CRT 4 as shown in FIG. 5, superimposing a present value of each X, Y, and Z axis on the prediction image $S_2$. It is noted that the micro-executor 18 is operated to display an edition image $S_3$ to set various failure prediction levels as shown in FIG. 5. It is also noted that a normal image $S_1$ displaying the working program in the execution is derived from the system ROM 2. A switching operation for the displayed images $S_1$ through $S_3$ will be described later.

In addition, if such an abnormality as described below occurs in the machine tool, the position deviation variable indicates a large value. Hence, the prediction of the failure is possible according to the change in the value of the position deviation.

① deterioration of ball screws
② gall of a slide
③ deterioration of a bearing
④ malfunction of a servo control mechanism "Setting of a prediction level on failure"

The data input device 6 serves as means for setting the prediction level $L_1$ (refer to FIG. 4) (threshold) on the failure with respect to the position deviation variable. That is to say, the data input device 6 provides means for switching the displayed image of a cursor on the screen of the CRT 4 into the edition image $S_3$ of FIG. 5 and for inputting the keyed information on a value of the prediction level $L_1$ as the set value with the cursor superposed on the displayed image. The value of the level $L_1$ keyed through the data Input device 6 is stored in a storage block 3A of the RAM 3. In addition, when the CRT 4 displays the prediction image $S_2$, the prediction level is displayed as the set value. The prediction level setting means corresponds to the series of operations described above using the data input device 6.

In the preferred embodiment of FIG. 2, the period of time during which the working process corresponding to a time duration from the point B to the point C in FIG. 4 is defined as the comparison period of time $T_1$. The position prediction level $L_1$ with respect to the position deviation variable for the period of time $T_1$ is thereby set.

It is noted that the value of the prediction level $L_1$ can be set a predetermined multiplied number as large as a maximum position deviation $e_{max}$ (hereinafter, referred to as a maximum follow-up deviation quantity) by which the tool T, for example, is moved by the machine tool at its maximum speed $V_{max}$.

The maximum position deviation variable $e_{max}$ is represented by the following equation (1):

$$e_{max} = V_{max}/K_v$$

In the equation (1), $K_v$ denotes a position loop gain (a total amplification factor in the servo mechanism) and serves as a measure of the follow-up accuracy of the servo mechanism. The value of $K_v$ is restricted due to the response inherent time constant $t_M$ of the servomotor.

In addition, the response time constant $t_M$ is represented by the following equation (2):

$$K_v \approx 1/t_M$$

$$t_M = \{(GD_L{}^2 + GD_M{}^2)\} N/375 \, (T_M - T_L)$$

N: rotation speed of a motor,
$GD_L{}^2$: load inertia,
$GD_M{}^2$: motor inertia,
$T_M$: Motor generation torque,
$T_L$: load generation torque.

"Setting off the comparison period of time"

In the preferred embodiment, the period of time during which the working process is executed from the point B to the point C, i.e., the period of time during which the tool T is fed at the constant feed speed without load is set as the comparison period of time $T_1$.

First, the point B is set by the PC 17 upon receipt of a predetermined check flag incorporated into the operating (working) program of the internal RAM 3. In the preferred embodiment, one of the codes (M codes) from among auxiliary function words (M functions) of the program is used and the M codes are incorporated before a preparation function (G function) in the working program corresponding to a movement instruction for the tool T from the point B to the point C. The PC 17 reads the M codes from among the working program to be executed and Checks to see whether the read M codes correspond to the check flag. At the time when the M codes are present, the point B is specified.

On the other hand, the point C is defined as a starting point of the end signal (DEN signal) at the time of execution end on the movement instruction for the tool T from the point B to the point C. The PC 17 functions as determining whether the end signal is output at the time of execution end on the movement instruction for the tool T to move from the point B to the point C in FIG. 3.

Hence, the series of operations for setting the comparison period of time correspond to the specification block described above.

"Failure Prediction Operation"

Figure 6:
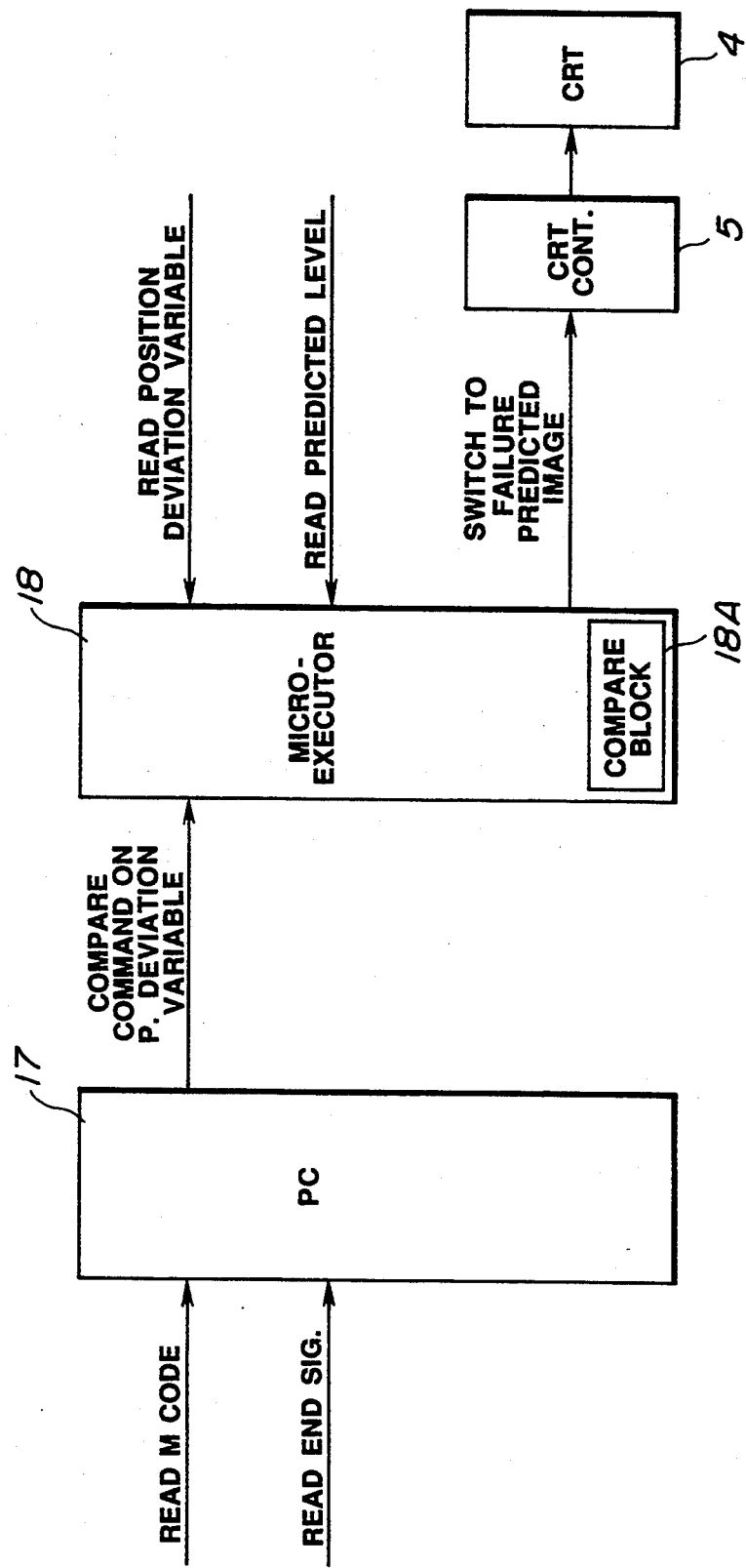
FIG. 6 is an explanatory view of functions of a microexecutor and PC (Programmable Controller) shown in FIG. 2 when a failure prediction operation is carried out according to a position deviation variable as the result of rotation of the servomotor shown in FIG. 2.
Figure 7:
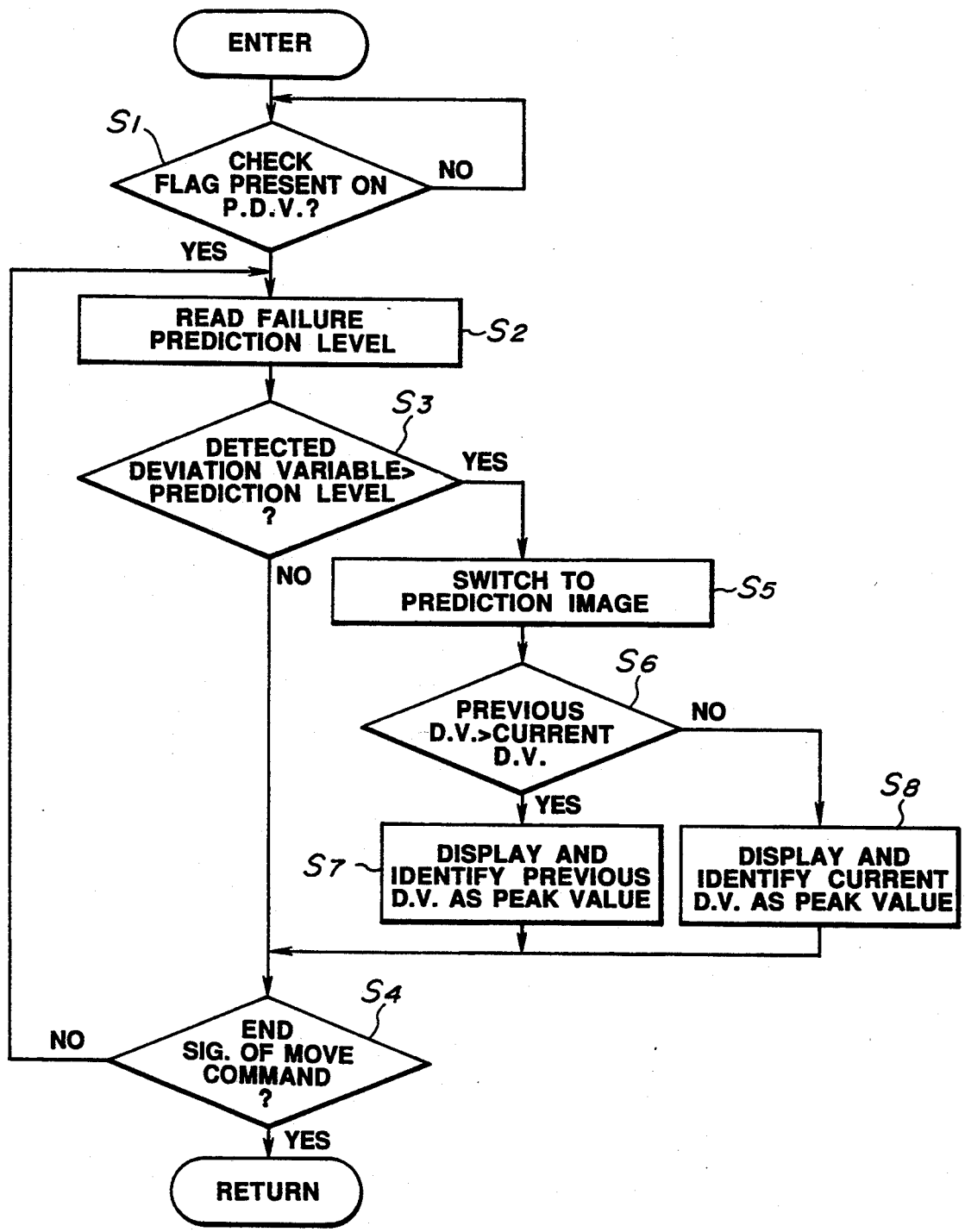
FIG. 7 is an operational flowchart of the micro-executor and PC shown in FIG. 2 for explaining the failure prediction operation on the basis of the position deviation variable as the result of rotation of the servomotor shown in FIG. 2.

FIG. 6 shows functions of the PC 17 and micro-executor 18 only on the failure prediction operation through the position deviation variable shown in FIG. 4 as the result of rotation of the servomotor 7. Hence, the failure prediction operation will be described in accordance with the flowchart of FIG. 7 and the functional diagram of FIG. 6.

First, the PC 17, in a step S1, determines whether the check flag on the position deviation variable is present in the read M codes from among the working program derived from the RAM 3. Then, the PC 17 issues a comparison command to the micro-executor 18 if the check flag is present. Then, the micro-executor 18 reads the prediction level $L_1$ of failure from the prediction level storing block 3A of the RAM 3 in a step S2. The comparison block 18A compares the prediction level $L_1$ with the position deviation variable read from the point B in FIG. 4 (hereinafter referred to as a detected deviation variable) at the comparison block 18A. This comparison operation is repeated until the end signal (DEN signal) on the movement instruction for the tool to move from the point B to the point C is read by means of the PC 17 of FIG. 4:

In a step S3, when the micro-executor 18 determines whether the detected deviation variable exceeds the prediction level $L_1$. the micro-executor 18 switches the displayed image of the CRT 4 to the prediction image $S_2$ of FIG. 5.

In the step $S_6$, the micro-executor 18 compares the present and previous detection deviation variables during the period from the point B to the point C in FIG. 4. Then, the micro-executor 18 outputs the larger value therebetween to the CRT controller 5 as the peak value.

Figure 8:
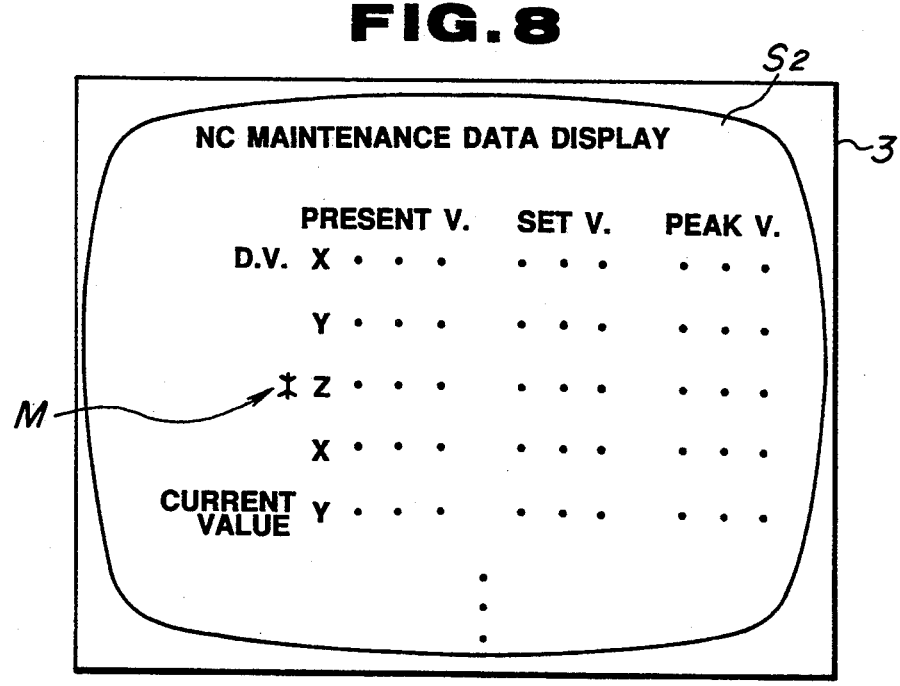
FIG. 8 is a front view of one of the series of images informing items of malfunctions in the machine tool through the CRT shown in FIG. 2.

In steps S7 and S8, the CRT 4 superimposes identifiably the peak value together with the present detection variable (present value) and set value of the prediction value $L_1$ on the displayed prediction image $S_2$. In the preferred embodiment, a mark M is additionally superimposed as shown in FIG. 8.

Hence. the comparison block 18A of the micro-executor 18 corresponds to the comparing means. The CRT corresponds to the informing means.

"Failure prediction through the load current value of the servomotor 7"

Load current value

The load current value is the feedback data from the servo amplifier 9 to the servo controller 8 as described before and input into the data bus.

The servo amplifier 9 corresponds to the detecting means.

Figure 9:
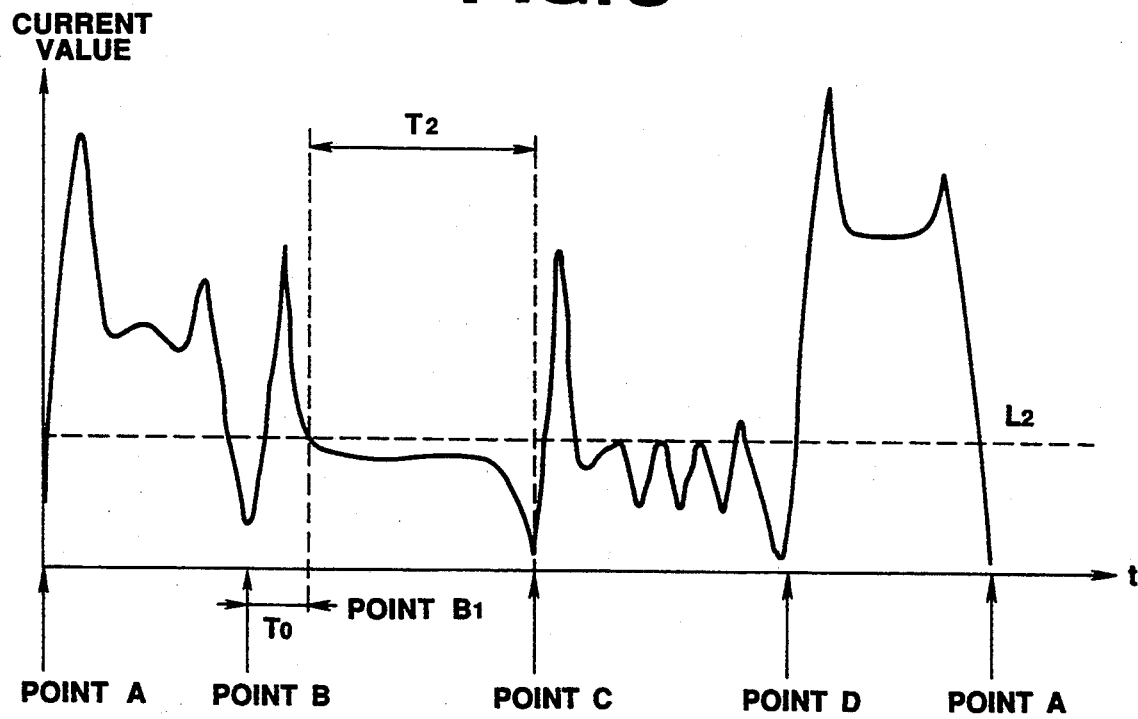
FIG. 9 is a characteristic graph of the load current of the servomotor in the series of working processes in the machine tool shown in FIG. 2.

In addition, the load current value is changed as shown in FIG. 9 during the series of normal working processes of the same machine tool. The load current value thus changed is always read by the PC 17. When the image on the CRT is switched to the prediction image $S_2$ of FIG. 5, the micro-executor 18 commands the CRT controller to superimpose the load current value changing as shown in FIG. 9 as the present value on the image of $S_2$.

The present value displayed on the CRT is monitored in the same way as the position deviation variable.

In addition, any of the abnormalities described in the following items ① through ② occurs in the machine tool, the micro-executor 18 indicates that the load current value is large. Consequently, the prediction of the failure becomes possible from the change in the load current value.

① Deterioration of ball screws.
② Deterioration of bearings.
③ Breakage in tools.
④ Mounting failure in work.
⑤ Failure in servo control mechanism.

Setting of prediction level of failure

The prediction level of failure for the load current value is set in the same way as that for the position deviation variable.

In this preferred embodiment, the period of time during which the series of working processes From the point $B_1$ to the point C in FIG. 9 is defined as the comparison period of time $T_2$. The failure prediction level $L_2$ for the load current value during the comparison period of time $T_2$ is thus set. It is noted that, in FIG. 9, the point $B_1$ is a point of time with a time interval of $T_O$ added to the point B. The point B is a start time at which the feed of the tool T with no load at the constant speed is carried out. The time interval To is a time interval during which the large current normally rises.

Setting of the comparison period of time

In this preferred embodiment, the period of time during which the series of working processes is carried out from the point $B_1$ in FIG. 9 to the point C is set as the comparison period $T_2$.

The point $B_1$ is set with the point B as the reference point. The point B is set in the same way as the position deviation variable. A time point at which a predetermined time has passed is set as the point $B_1$. The function to derive the point $B_1$ from the point B is carried out by the timer 17B.

On the other hand, the point C is set in the same way as in the case of the position deviation variable.

Operation of failure prediction

Figure 10:
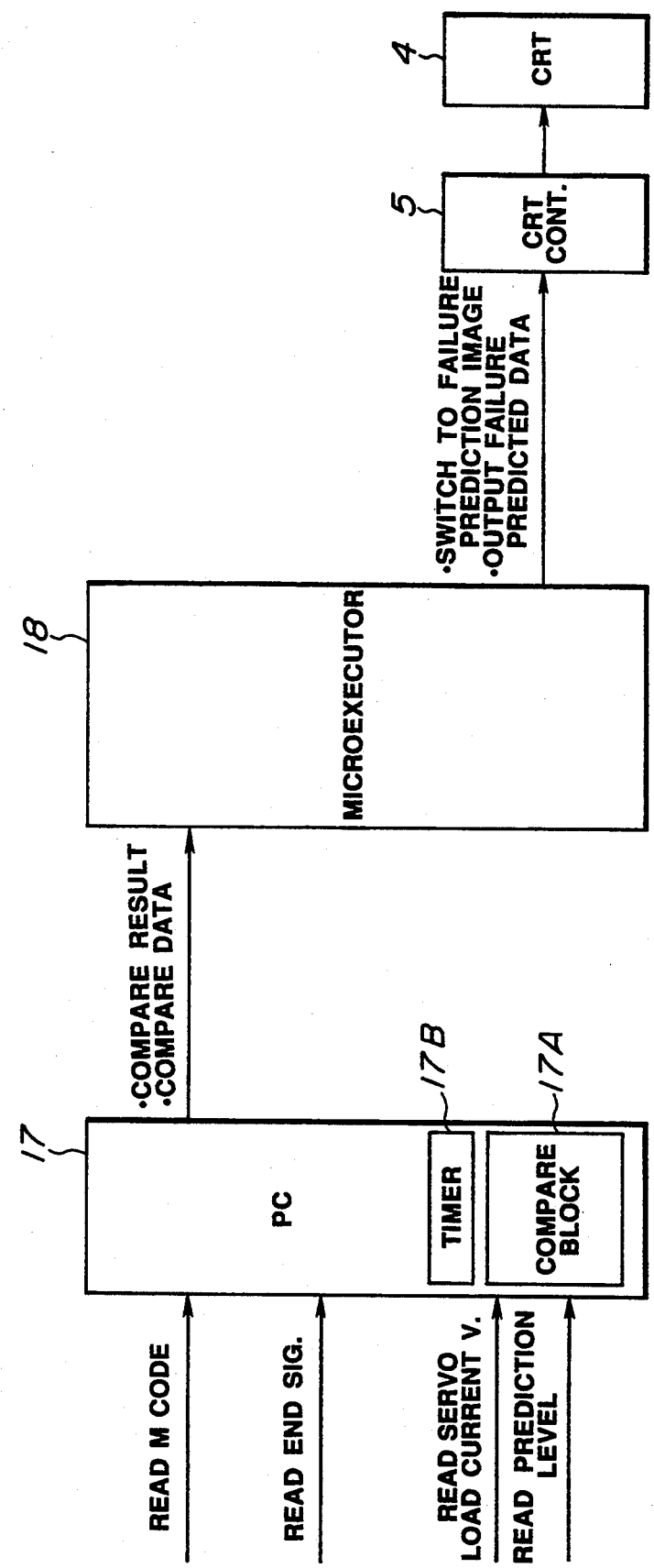
FIG. 10 is an explanatory view of functions of the micro-executor and PC shown in FIG. 2 when the failure prediction operation is carried out according to a load current value flowing through the servomotor shown in FIG. 2.

FIG. 10 shows a functional diagram of the PC 17 and micro-executor 18 only concerning the failure prediction operation according to to the load current value described above.

Figure 11:
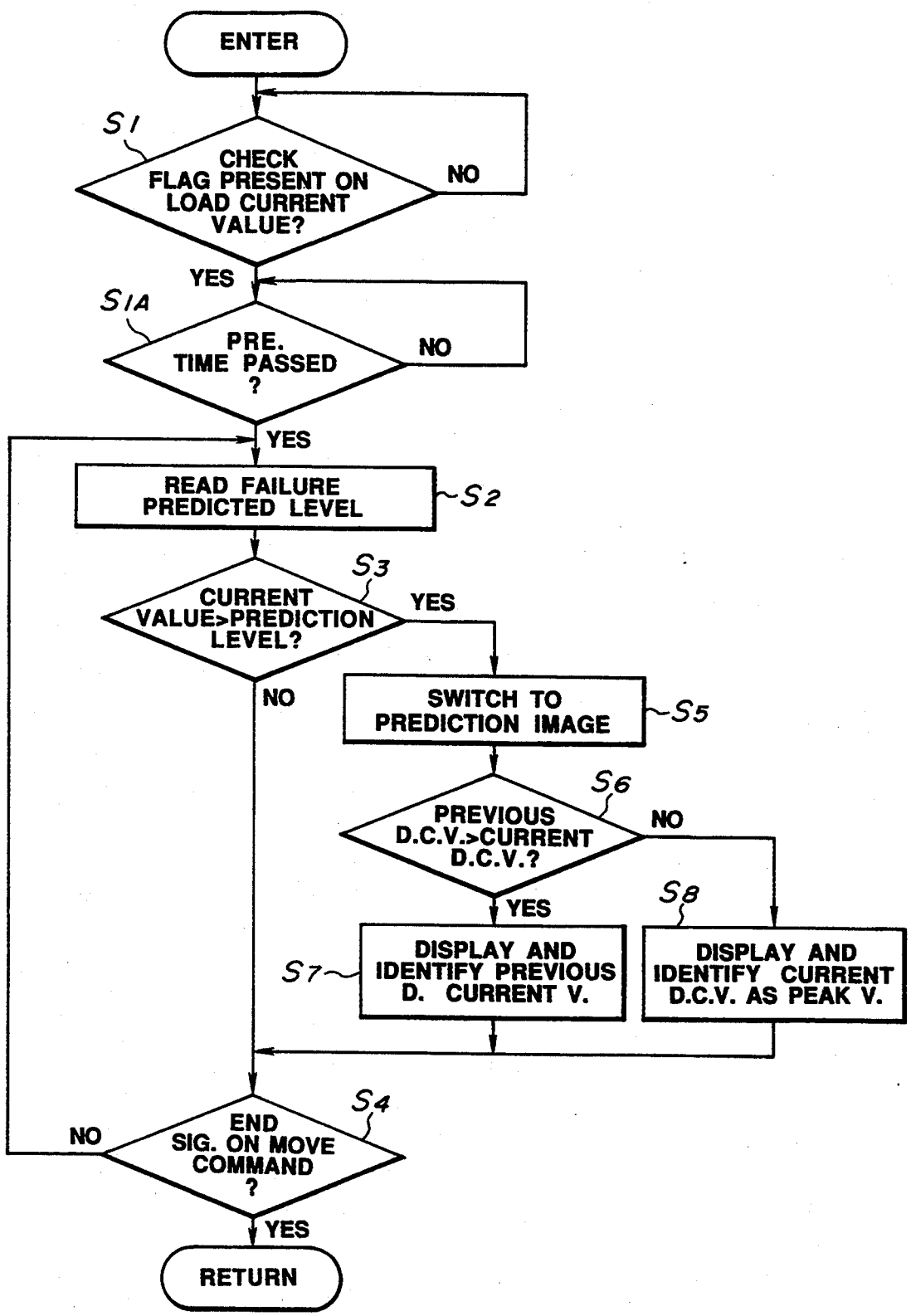
FIG. 11 is an operational flowchart for explaining the failure prediction operation on the basis of the load current value of the servomotor.

FIG. 11 shows a flowchart explaining the failure prediction operation on the basis of the load current value.

The basic Failure prediction operation is the same as that in the case of the position deviation variable and only the points of difference will be explained below.

One of the difference points is that the routine goes from a step S1A to a step S2 provided that it takes a predetermined period of time. The predetermined period of time corresponds to the rising time $T_O$ in FIG. 9 as described above and the predetermined period of time is set by a timer 17B of the PC 17. Hence, since the timer 17B is operated at the step S1A, a time at which the timer 17B counts up is the start time $B_1$ at which the comparison of the load current value is started.

One of the other difference points is that the load current value and prediction level are read by the PC 17. A comparison block 17A of the PC 17 carries out the comparison of these data and displays the result of comparison via the micro-executor 18 on the CRT 4.

C. Failure prediction according to the orientation time of the main axle.

Orientation time

The orientation time is defined as a time duration during which the CPU 1 issues a command to position the main axle at a predetermined position of rotation in order to carry out the replacement of the tool and thereafter the positioning of the tool is ended.

Then, the orientation time indicates a large value in a case where such abnormalities as described below in ① and ② occur in the machine tool. Hence, it is possible to predict the failure according to the change in its value.

① Failure such as the position sensor 15 (refer to FIG. 2) of a constant position determining block.
② Failure in the main axle motor 11.

Setting of prediction level on failure

The failure prediction level (in time) for the orientation time is set in the same way as in the case of the position deviation variable described above.

In the preferred embodiment, an interval of time during which the CPU 1 issues the orientation start command and, thereafter, an orientation end signal from the CPU 1 on the basis of the signal derived from the position sensor 15 is input into the system bus via the I/O unit 16 is set as the orientation time. The prediction level (time) of failure is set with respect to the measured orientation time.

Setting of the comparison interval of time

In a case where the orientation time is used as the monitor data, a time interval during which the orientation is started and ended is set as a measurement interval of time during which the orientation is carried out and the positioning of the main axle is ended. The end timing of the measurement of the orientation time starts the comparison period of the prediction level.

The orientation time indicates a larger value in a case where the abnormality in the machine tool occurs in the machine tool. Hence, the failure prediction is possible according to the change in the value of orientation time.

① Failure in the position sensor 15 (refer to FIG. 2) of the position determining block.
② Failure of the main axle motor 11

Setting of the prediction level of failure

The prediction level (time) of failure for the orientation time is set in the same way as the position deviation variable described above.

In the preferred embodiment, a time duration s during which the CPU 1 issues the orientation start command and thereafter the orientation end signal is input into the system bus via the I/O unit 16 is set as the orientation time. Then, the prediction level (in units of time) of failure for the orientation time is set.

Setting of the comparison period

In a case where the orientation time is used as the monitor data, the period of time during which the orientation is started and ended is set as the measurement period of time for the orientation time. The end time of the measurement is a start time of the comparison period with the prediction level.

First, the point of start at which the orientation time is measured is a point of time at which any code of the various kinds of codes (M codes) of the auxiliary functions (M function) of the working program is read by the PC and executed from the RAM 3. Hence, if the M codes from the working program to be executed are read and whether the read codes correspond to the orientation start command is checked. Then, the measurement start time of the orientation time can be specified. Its checking function is carried out by the PC 17.

On the other hand, the point of time at which the orientation time is measured and ended is a time at which the orientation end signal based on the signal from the position sensor 15 is input into the system bus via the I/O unit 16. The PC 17 determines whether the orientation end signal is input.

Hence, the series of operations of setting the measurement start time and of setting the end time correspond to the specification block described above.

Figure 12:
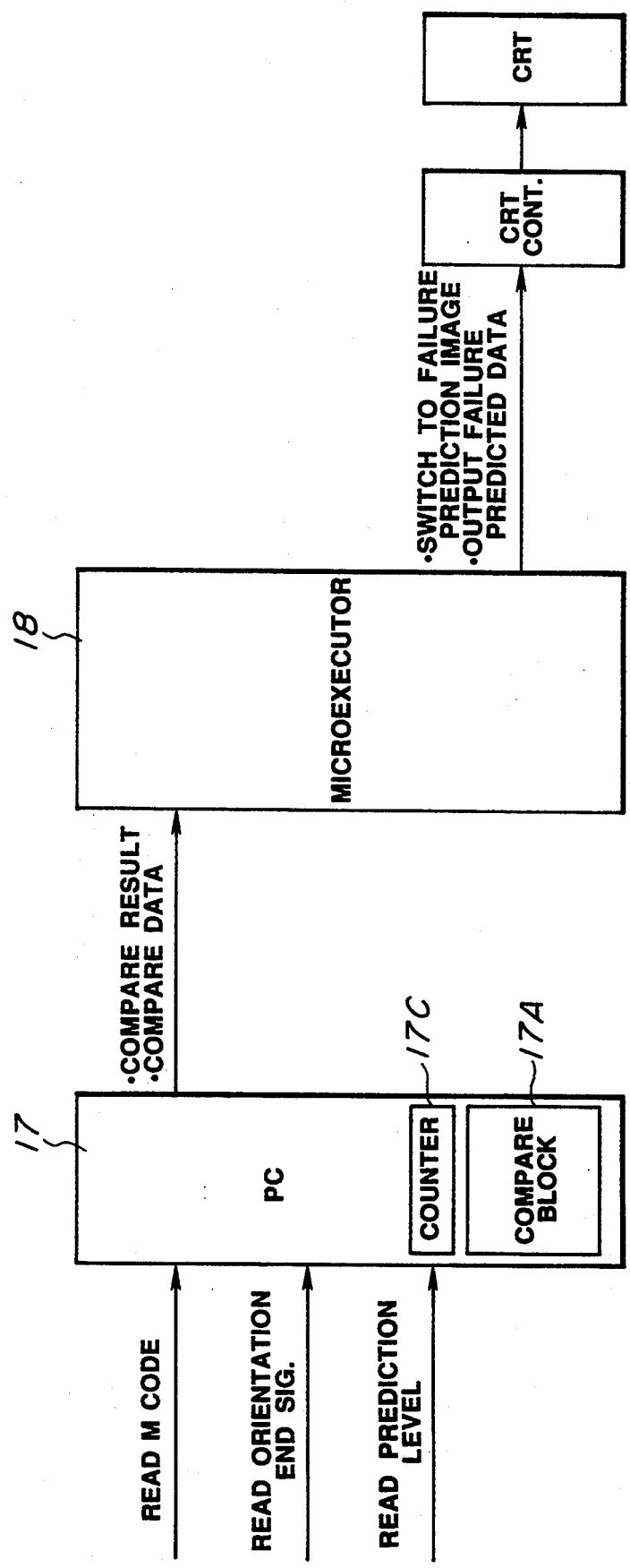
FIG. 12 is an explanatory view of functions of the PC and micro-executor shown in FIG. 2 when the failure prediction operation is carried out on the basis of an orientation time of a main axle as the monitor data.

FIG. 12 shows a functional block diagram of the PC 17 and micro-executor 18 only concerning the orientation time and failure prediction operation for the orientation time.

Figure 13:
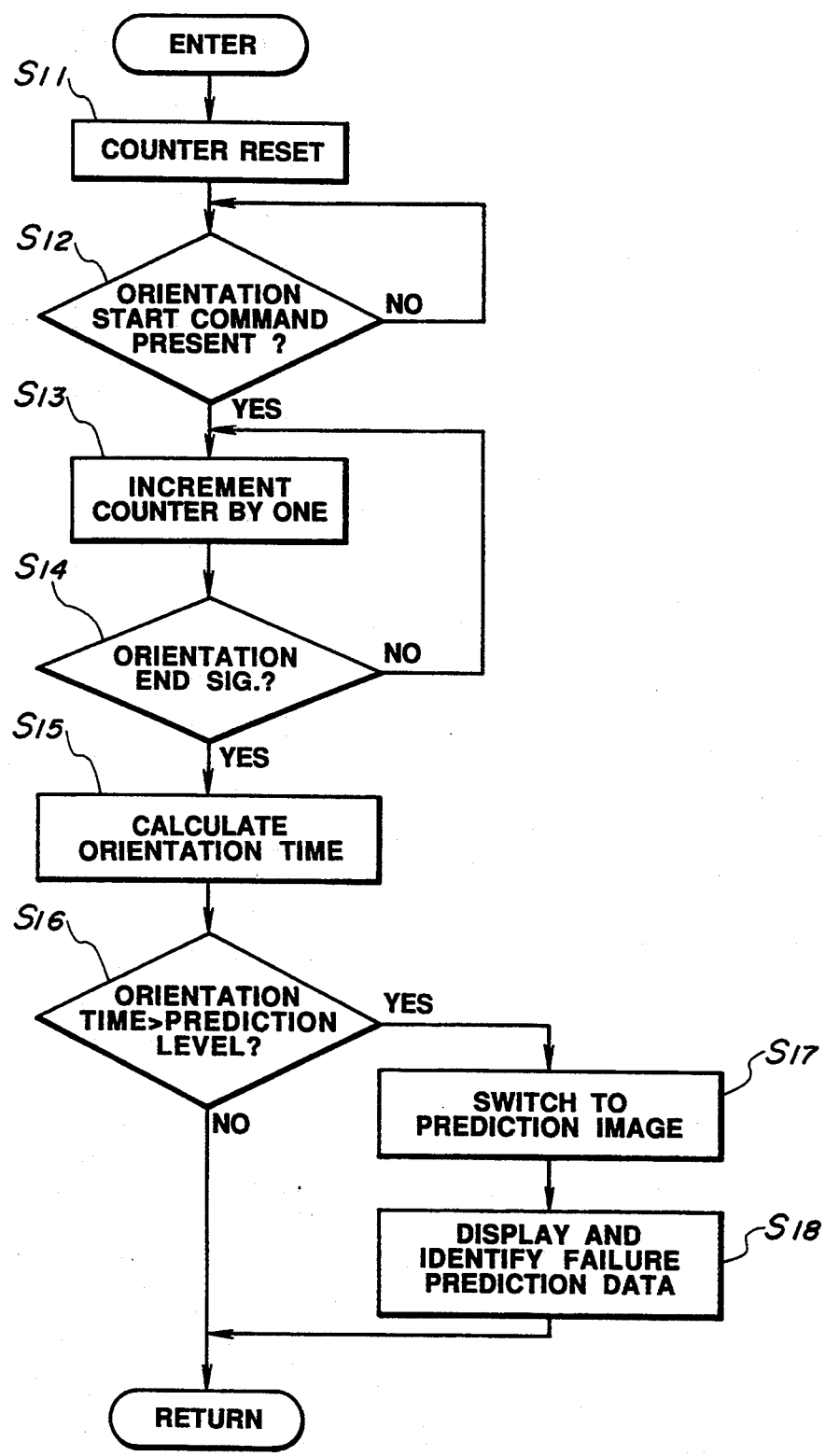
FIG. 13 is an operational flowchart for explaining the failure prediction operation on the basis of an orientation time of a main axle of the machine tool.

FIG. 13 shows a flowchart for explaining the failure prediction operation.

In a step S11, the PC 17 resets an internal counter 17C. Thereafter, provided that any code which corresponds to the orientation start command is present in the M codes in the working program in a step S12, the counter 17C is counted up by one in a step S13. This count up is repeated until the PC 17 has read the orientation end signal in a step S14.

When the orientation end signal is read in a step S14, the orientation time is calculated from the count value of the counter 17C in a step S15. The comparison block 17A of the PC 17 determines whether the calculated value exceeds the prediction level (time). When the calculated value exceeds the prediction level, the micro-executor 18 is operated to switch the displayed image to the prediction image of the CRT 4. The data on the calculated value for the orientation time are indentifiably displayed.

The prediction image at this time is such that the set value of the prediction level and calculated value of the orientation time are superimposed in the same way as the prediction image $S_2$ of FIG. 8 and the failure is predicted with the mark M superimposed thereon so as to inform the failure.

Hence, the comparison block 17A of the PC 17 corresponds to the comparison block described above and CRT 4 corresponds to the informing means.

In the preferred embodiment, whenever the orientation start command is issued, the orientation time is derived and compared. The value of the prediction level for the respective orientation times may be alternatively selected according to the situations when the orientation command is issued, i.e., whether the main axle is rotated.

In addition, in the same way as in the case of the comparison period for the position deviation variable is set, the comparisons may be carried out only upon the issuance of the thereafter orientation command provided that the check flag previously incorporated into the NC program is issued.

D. Failure prediction according to the speed arrival time of the main axle.
Speed arrival time of the main axle The speed arrival time is defined by a time duration during which the CPU 1 issues a rotation command so that the main axle motor 11 is rotated at a predetermined target rotation speed and the main axle motor 11 reaches the predetermined target rotation speed.

The value of a speed arrival time indicates the large value when any of the abnormalities described in the following items ① and ② occurs in the machine tool. Hence, the prediction of the failure becomes possible according to the value of the change in the speed arrival time.

① Deterioration in the bearing of the main axle motor 11.

② Failure in the rotation detector of the main axle pulse generator.

Setting of the prediction level of the failure

In a case where the speed arrival time of the main axle is used as the monitor data, the period of time during which the main axle motor 11 receives the rotation command and the rotation speed reaches the predetermined target rotation speed is set as the measurement period of time of the speed arrival time. The measurement period of time is the comparison period of time for the prediction level.

The measurement start time for the speed arrival time is a time at which ① a predetermined check flag is read which has previously been incorporated into the working program of the RAM 3 and, thereafter, ② a rotation command is issued to revolve the main axle motor 11 by a predetermined rotation speed.

To set the time of ①, one of the codes (M codes) can be used from among the auxiliary function (M functions) in the working program. In addition, the point of time of ② is a time at which any code of the various codes (M codes) of the auxiliary function words of the working program which corresponds to the rotation command of the main axle motor 11 is read from the RAM 3 and executed. When the M codes in the program are read and executed, the point of measurement start can be specified by checking whether any code corresponding to the check flag and corresponding to the rotation command is checked. Consequently, the time at which the measurement is started can be specified. Such a checking function as described above is performed by the PC 17.

On the other hand, the time of the end of measurement is a time at which the speed arrival time signal from the main axle amplifier 13 is input from the I/O unit 16 to the system bus. The PC 17 determines whether the speed arrival signal is input or not.

Hence, the series of operations of the time at which the measurement start time is carried out and at which the end point is set corresponds to the specification block.

Failure prediction operation

Figure 14:
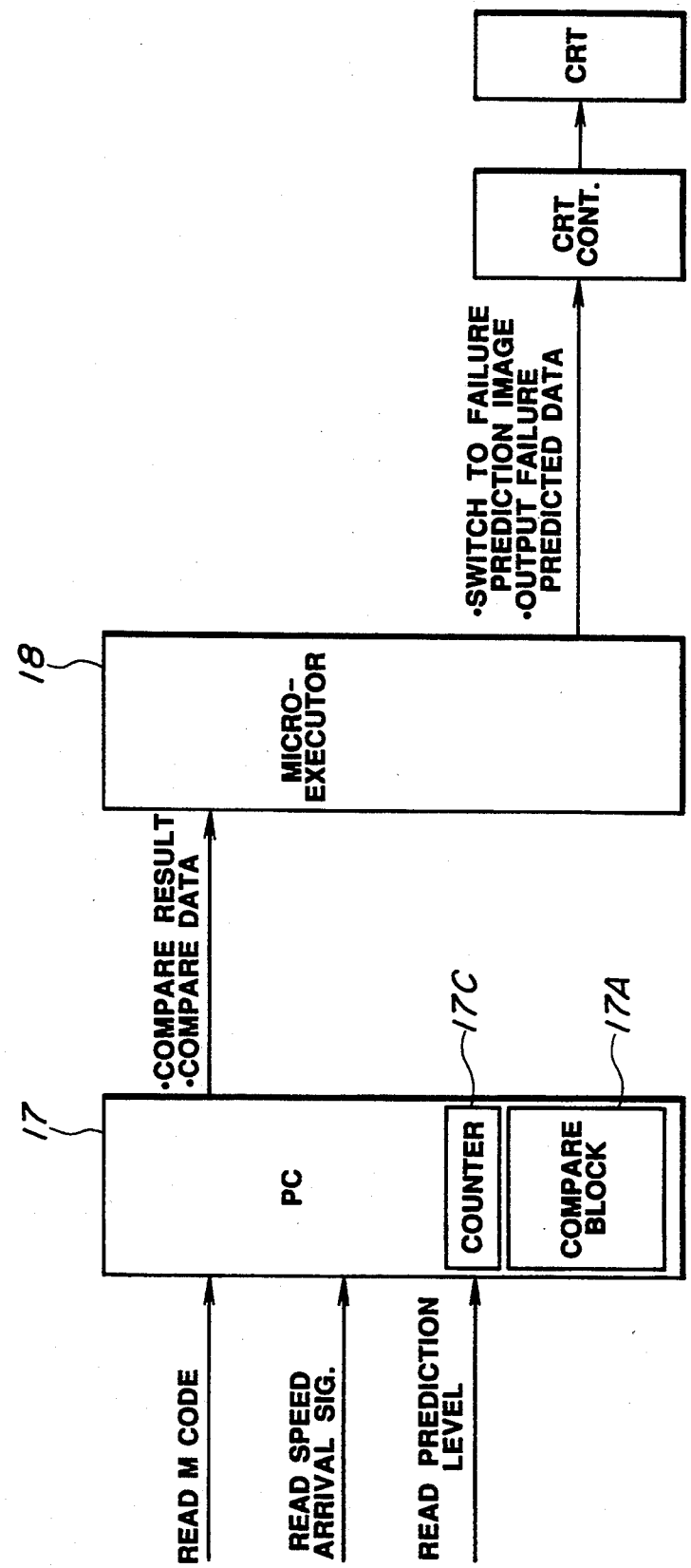
FIG. 14 is an explanatory view of functions of the PC and micro-executor shown in FIG. 2 when the failure prediction operation is carried out on the basis of a speed arrival time of the main axle of the machine tool as the monitor data.

FIG. 14 shows a functional block diagram of the PC 17 and micro-executor 18 only concerning the speed arrival time of the main axle and failure prediction operation.

Figure 15:
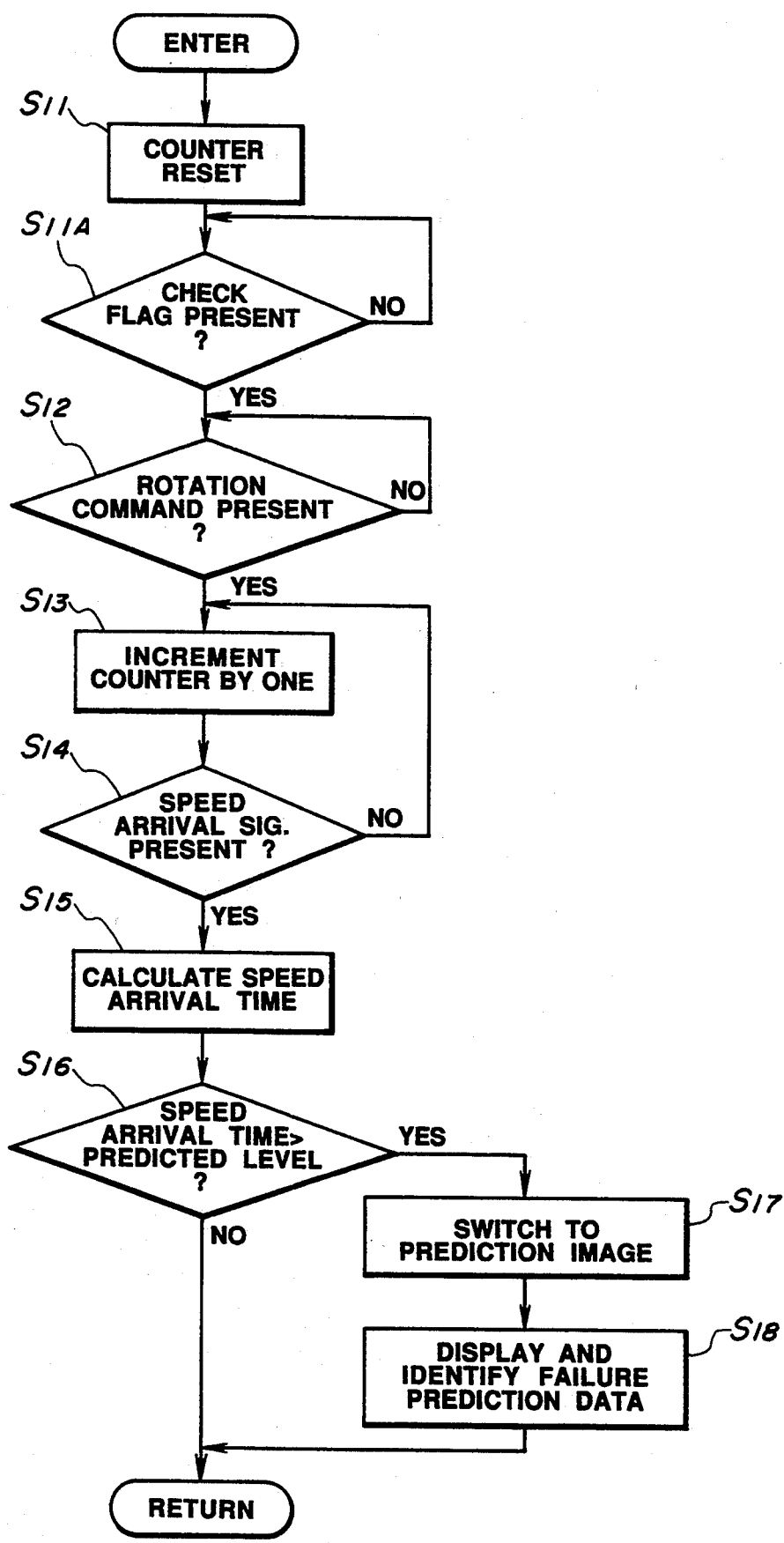
FIG. 15 is an operational flowchart for explaining the failure prediction operation on the basis of the speed arrival time of the main axle as monitor data.

FIG. 15 shows the flowchart explaining the operation of the failure prediction on the basis of the speed arrival time.

The basic failure prediction operation is the same as in the case of the orientation time described above.

Therefore, only the differences will be described below.

A difference is that the routine in FIG. 15 goes from a step S11 to a step S12 provided that the PC 17 determines that any code of the M codes in the working program corresponds to the check flag.

It is noted that the rotation command of the main axle motor 11 is determined whether it is a command to rotate the main axle motor 11 in a rightward direction or in a leftward direction and the failure prediction can be carried out according to the rotation direction of the main axle motor 11. In this case, the failure prediction level may be selected according to the rotation direction of the main axle motor 1.

As described hereinabove, in the failure prediction system according to the present invention, various data which are changed according to operating situations of the series of operations of the machine tool can be set as the monitor data in addition to the four monitored data described above.

A plurality of monitoring intervals time are set during the series of working processes in the machine tool. At their respective intervals of time, the same or different monitor data may be monitored. In this case, their respective intervals may be discriminated according to their check flags. In addition, the failure prediction level may be selected according to their respective intervals.

The monitoring interval of time for the monitored data may arbitrarily be set.

The monitored interval may be set, e.g., on the basis of the speed and movement quantity of a moving part of the machine tool, on the basis of a magnitude of working load, or on the basis of whether the value of the monitored data has reached a predetermined value.

As described hereinabove, since, in the failure prediction system and method according to the present invention, the time at which a predetermined working process is carried out during the series of working processes in the machine tool is specified as the monitoring period of time of the monitored data, the failure prediction level can be set according to the operating situations of the specified period of time under monitor. Consequently, an earlier prediction on the basis of the comparison result between the failure prediction level and monitored data can accurately be made.

It will fully be appreciated by those skilled in the art that the foregoing description has been made of the preferred embodiment and various changes and modifications may be made without departing from the scope of the present invention which is to be defined by the appended claims.

What is claimed is:

1. A system for predicting an occurrence of failure in a machine tool, comprising:
   a) first means for detecting a monitor data which is changed according to an operating situation in a series of working processes of the machine tool within an operating cycle, said first means including fifth means for detecting a position deviation variable of a tool as a result of rotation of a servomotor installed in the machine tool as the monitor data, the position deviation variable being defined as a deviation in position of the tool between contents of a movement instruction for the tool derived from a CPU to the servomotor and contents of an output pulse signal of a pulse encoder indicating an actual movement distance of the tool;
   b) second means for variably setting a prediction level of failure against the monitor data, the prediction level being varied according to different types of operating situations in the machine tool within the operating cycle;
   c) third means for comparing the monitor data detected by the first means with the prediction level set by the second means during a predetermined one of the series of working processes of the machine tool, said predetermined one of the series of working processes including the servomotor rotation, and outputting a failure prediction signal when the value of the monitor data exceeds the prediction level; and
   d) fourth means for informing the prediction of the occurrence of failure on the basis of the received failure prediction signal.

2. A system for predicting an occurrence of failure in a machine tool as set forth in claim 1, wherein said machine tool is a Numerical Control machine tool which is operated in accordance with a predetermined working program and wherein said third means sets the predetermined working process as a comparison period of time during which the third means compares the monitor data with the prediction level on the basis of a time during which a predetermined command in the working program of the Numerical Control machine tool has been processed.

3. A system for predicting an occurrence of failure in a machine tool as set forth in claim 2, wherein said third means sets the comparison period on the time when a constant speed feed of the tool with no load on the tool is carried out.

4. A system for predicting an occurrence of failure in a machine tool as set forth in claim 3, wherein said third means sets the comparison period of time in such a way that the third means reads a working program stored in a RAM and determines that a M code is present in one of the series of working programs on the movement instruction read from the RAM, the read timing of the M code being a start timing of the comparison period of time, and determines that an end signal of completion of processing of the movement instruction is output from the CPU, the read timing of the end signal being an end timing of the comparison period of time.

5. A system for predicting an occurrence of failure in a machine tool as set forth in claim 4, wherein said second means sets the prediction level which is a predetermined multiplied number as large as a maximum follow-up deviation variable $e_{max}$ when the machine tool moves the tool at its maximum speed $V_{max}$.

6. A system for predicting an occurrence of failure in a machine tool as set forth in claim 5, wherein said second means includes a data input device of the NC machine tool.

7. A system for predicting an occurrence of failure in a machine tool as set forth in claim 6, wherein said third means includes a Programmable Controller connected to the CPU via a system bus.

8. A system for predicting an occurrence of failure in a machine tool as set forth in claim 7, wherein said fourth means includes a micro-executor, a CRT controller, and a CRT, the micro-executor being operated to switch a displayed image on the CRT to a prediction image when said Programmable Controller determines that a detected position deviation variable exceeds the prediction level, to compare a magnitude of a present value of the detected position deviation variable with that of a previous value thereof, and to output a larger value of the present and previous values of the position deviation variable to the CRT controller as a peak value so that the CRT displays the prediction image on which the peak value is superimposed together with the prediction level and the presently detected deviation variable.

9. A system for predicting an occurrence of failure in a machine tool as set forth in claim 2, wherein said first means detects a time duration defined as an orientation time during which in order to carry out a tool replacement a CPU issues an instruction to position and stop a main axle installed in the machine tool at a constant rotation position and the operation in response thereto at the main axle is actually ended.

10. A system for predicting an occurrence of failure in a machine tool as set forth in claim 9, wherein said third means sets the comparison period of time on the basis of the orientation time when the machine tool operates normally.

11. A system for predicting an occurrence of failure in a machine tool as set forth in claim 10, wherein said orientation time is a time duration during which the CPU issues an orientation start instruction and thereafter the CPU issues an orientation end signal and the orientation end signal is input into a system bus via an input/output unit on a basis of an output signal of a position sensor for detecting a rotation position of the main axle.

12. A system for predicting an occurrence of failure in a machine tool as set forth in claim 2, wherein said first means detects a time duration defined as a speed arrival time during which a main axle installed in the machine tool reaches a predetermined rotation speed from a predetermined time at which the main axle starts rotation.

13. A system for predicting an occurrence of failure in a machine tool as set forth in claim 12, wherein said third means sets the comparison period of time on the basis of the speed arrival time when the machine tool operates normally.

14. A system for predicting an occurrence of failure in a machine tool as set forth in claim 13, wherein said speed arrival time is a time duration during which a predetermined check flag incorporated into the working program for the main tool operation is read by a Programmable Controller, thereafter, a rotation instruction to rotate the main axle a predetermined target rotation speed is issued, the issued timing of the rotation instruction being a start timing for the measurement of the speed arrival time and a speed arrival signal is derived from a main axle amplifier via an input/output unit to a system bus, the timing at which the speed arrival signal is output being an end timing of the measurement of the speed arrival time.

15. A system for predicting an occurrence of failure in a machine tool comprising:
   a) first means for detecting a monitor data which is changed according to an operating situation in a series of working processes of the machine tool within an operating cycle, said first means including fifth means for detecting a load current of a servomotor installed in the machine tool as the monitor data, sixth means for detecting a position deviation variable of the servomotor, seventh means for detecting an orientation time of a main axle of the machine tool, and eighth means for detecting a speed arrival time at which the rotation of the main axle reaches a predetermined target speed;
   b) second means for variably setting a prediction level of failure against the monitor data, the prediction level being varied according to different types of operating situations in the machine tool within the operating cycle;
   c) third means for comparing the monitor data detected by the first means with the prediction level set by the second means during a predetermined one of the series of working processes of the machine tool, said predetermined one of the series of working processes including servomotor operation and main axle rotation, and outputting a failure prediction signal when the value of the monitor data exceeds the prediction level; and
   d) fourth means for informing the prediction of the occurrence of failure on the basis of the received failure prediction signal, wherein said machine tool is a Numerical Control machine tool which is operated in accordance with a predetermined working program and wherein said third means sets the predetermined working process as a comparison period of time during which the third means compares the monitor data with the prediction level on the basis of a time during which a predetermined command related to the servomotor operation and the main axle rotation in the working program of the Numerical Control machine tool has been processed.

16. A system for predicting an occurrence of failure in a machine tool as set forth in claim 15, wherein said first means includes a Programmable controller which reads a feedback data from a servo amplifier to a servo controller of a servo mechanism around the servomotor via a data bus.

17. A system for predicting an occurrence of failure in a machine tool as set forth in claim 16, wherein said third means sets the comparison period of time in such a way that said third means measures a time duration from a time at which a feed of a tool with no load on the tool is started, a point of time at which the time duration has passed being the start timing of the comparison period of time, and said third means determines that an end signal of positioning the tool is issued from a CPU as the end timing of the comparison period.

18. A system for predicting an occurrence of failure in a machine tool as set forth in claim 17, wherein said third means includes a timer for measuring the time duration during which a large load current rises.

19. A system for predicting an occurrence of failure in a machine tool as set forth in claim 15, wherein said different types of operating situations include a servomotor operation and a main axle orientation.

20. A system for predicting an occurrence of failure in a machine tool as set forth in claim 19, wherein said different types of operating situations further include a main axle rotation.

21. A method for predicting an occurrence of failure in a machine tool, comprising the steps of:
   a) detecting at least one monitor data which is changed according to an operating situation in a series of working processes in the machine tool within an operating cycle, said at least one monitor data including a position deviation variable of a tool as a result of rotation of a servomotor installed in the machine tool;
   b) variably setting a prediction level of failure against the monitor data, the prediction level being varied according to different types of operating situations in the machine tool within the operating cycle;
   c) setting a comparison period of time according to the series of the working processes and comparing the monitor data detected in the step a) with the prediction level set in the step b) during a predetermined one of the series of working processes of the machine tool set as the comparison period of time, said predetermined one of the series of working processes including servomotor rotation;
   d) outputting a failure prediction signal when the value of the monitor data exceeds the prediction level; and
   e) informing the prediction of the occurrence of failure on the basis of the received failure prediction signal.

22. A method for predicting an occurrence of failure in a machine tool, comprising the steps of:

a) detecting at least one monitor data which is changed according to an operating situation in a series of working processes in the machine tool within an operating cycle, said monitor data being a load current of a servomotor installed in the machine tool;

b) variably setting a prediction level of failure against the monitor data, the prediction level being varied according to different types of operating situations in the machine tool within the operating cycle;

c) setting a comparison period of time according to the series of the working processes and comparing the monitor data detected in the step a) with the prediction level set in the step b) during a predetermined one of the series of working processes of the machine tool set as the comparison period of time;

d) outputting a failure prediction signal when the value of the monitor data exceeds the prediction level; and e) informing the prediction of the occurrence of failure on the basis of the received failure prediction signal.

* * * * *